(12) United States Patent
Dohrmann

(10) Patent No.: US 8,359,820 B2
(45) Date of Patent: Jan. 29, 2013

(54) ULTRA-LOW FLOW AGRICULTURAL PUMP WITH UNOBSTRUCTED FLOW PATH AND ELECTRONIC FLOW CONTROL, TANK REFILL INDICATION, AND DETECTION OF LOSS OF FLOW

(76) Inventor: Daniel R. Dohrmann, Sartell, MN (US)

( * ) Notice: Subject to any disclaimer, the term of this patent is extended or adjusted under 35 U.S.C. 154(b) by 0 days.

(21) Appl. No.: 13/006,420

(22) Filed: Jan. 13, 2011

(65) Prior Publication Data

US 2011/0167777 A1    Jul. 14, 2011

Related U.S. Application Data

(60) Provisional application No. 61/294,803, filed on Jan. 13, 2010.

(51) Int. Cl.
*A01D 19/00*    (2006.01)
(52) U.S. Cl. ............................. 56/16.8; 239/329; 239/77
(58) Field of Classification Search .................. 239/329, 239/77, 8, 13, 11, 74, 110, 317, 319, 104, 239/106, 172, 722, 723, 727, 128, 149, 112, 239/93, 95, 349; 100/73, 74; 56/16.8
See application file for complete search history.

(56) References Cited

U.S. PATENT DOCUMENTS

| | | | |
|---|---|---|---|
| 3,472,454 A * | 10/1969 | Donelson et al. ............... 239/77 |
| 3,693,438 A | 9/1972 | Yamasaki et al. |
| 3,703,088 A | 11/1972 | Moorhead |
| 3,792,610 A | 2/1974 | Kountanis et al. |
| 3,841,555 A * | 10/1974 | Lilja ................................. 239/8 |
| 3,917,168 A * | 11/1975 | Tenney ........................... 239/13 |
| 3,940,986 A | 3/1976 | Yamasaki et al. |
| 4,182,491 A * | 1/1980 | Parke et al. ..................... 239/11 |
| 4,220,998 A * | 9/1980 | Kays .............................. 700/283 |
| 4,314,450 A | 2/1982 | Pelloux-Gervais |
| 4,392,611 A * | 7/1983 | Bachman et al. ............... 239/74 |
| 4,438,686 A | 3/1984 | Perez |
| 4,473,188 A | 9/1984 | Ballu |
| 4,714,196 A | 12/1987 | McEachern et al. |
| 4,723,709 A * | 2/1988 | Curran et al. ................. 239/110 |
| 4,793,742 A | 12/1988 | Strand |
| 4,801,210 A | 1/1989 | Gian |
| 4,818,546 A | 4/1989 | Whitford |
| 4,823,614 A | 4/1989 | Dahlin |
| 4,831,885 A | 5/1989 | Dahlin |
| 4,850,997 A | 7/1989 | DuBose |
| 5,004,155 A | 4/1991 | Dashevsky |
| 5,012,974 A | 5/1991 | Johnson |
| 5,016,817 A | 5/1991 | Ghate et al. |
| 5,046,701 A | 9/1991 | Barber |
| 5,064,123 A | 11/1991 | Aiello et al. |
| 5,089,407 A | 2/1992 | Baker et al. |

(Continued)

FOREIGN PATENT DOCUMENTS

| | | |
|---|---|---|
| EP | 0834259 A1 | 4/1998 |
| JP | 2005-526479 A | 9/2005 |

*Primary Examiner* — Arpad Fabian-Kovacs
(74) *Attorney, Agent, or Firm* — Albert W. Watkins

(57) ABSTRACT

A harvester has an operator cab, a motor, a carriage driven by the motor, a crop cutter and collector, a processing body, and an ultra-low flow agricultural forage preservative applicator system for applying a biological solution to forage during harvesting. The forage preservative applicator has a biological solution reservoir, a flush reservoir, a peristaltic pump, a valve operative to either couple the pump with the biological solution or the flush solution, and a dispensing tube, where the biological fluid containing pathways are of functionally like cross-section in the region between the biological solution reservoir outlet and the dispensing tube outlet. A flow detector which does not obstruct the fluid pathway is provided to monitor biological solution flow rate, and a moisture detector and harvest rate detector may be used for automatic control.

8 Claims, 5 Drawing Sheets

U.S. PATENT DOCUMENTS

Figure 1:
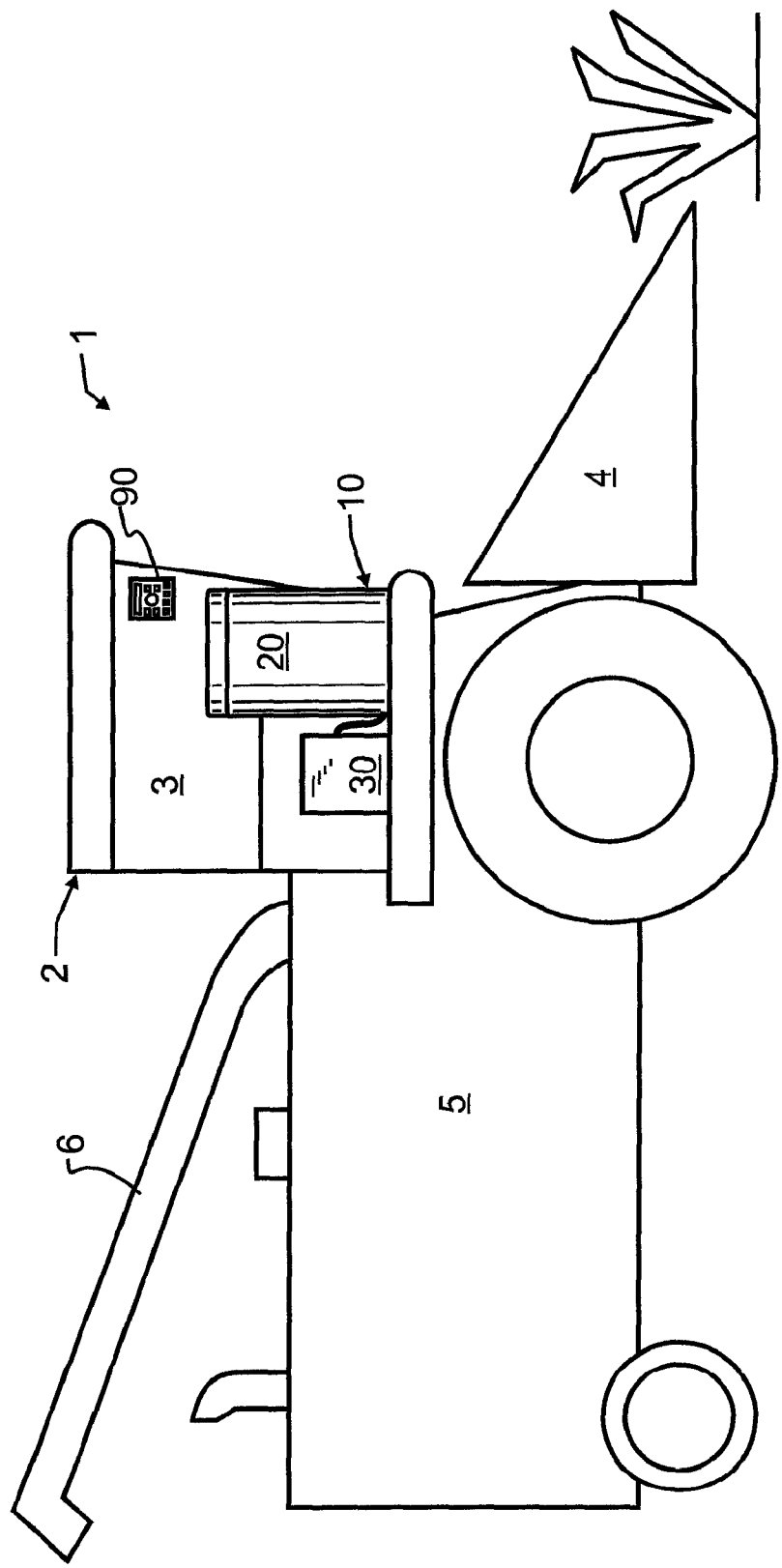

| | | |
|---|---|---|
| 5,092,526 A | 3/1992 | Takata |
| 5,147,133 A | 9/1992 | White |
| 5,184,077 A | 2/1993 | Day et al. |
| 5,193,744 A | 3/1993 | Goldstein |
| 5,227,067 A | 7/1993 | Runyon |
| 5,292,657 A | 3/1994 | Rutherford et al. |
| 5,314,619 A | 5/1994 | Runyon |
| 5,514,973 A | 5/1996 | Byler et al. |
| 5,637,494 A | 6/1997 | King |
| 5,679,377 A | 10/1997 | Bernstein et al. |
| 5,718,377 A * | 2/1998 | Tedders et al. ............ 239/8 |
| 5,739,081 A | 4/1998 | Lloyd et al. |
| 5,785,523 A | 7/1998 | Overmyer |
| 5,851,452 A | 12/1998 | Vallet Mas et al. |
| D409,303 S | 5/1999 | Oepping |
| 6,020,744 A | 2/2000 | Ghorashi et al. |
| 6,062,256 A | 5/2000 | Miller et al. |
| 6,088,657 A | 7/2000 | Mcmahon |
| 6,089,409 A | 7/2000 | Hart et al. |
| 6,125,621 A | 10/2000 | Burch |
| 6,138,767 A * | 10/2000 | La Vergne ............ 169/15 |
| 6,148,536 A | 11/2000 | Iijima |
| 6,202,697 B1 | 3/2001 | Oyama et al. |
| 6,280,408 B1 * | 8/2001 | Sipin ............ 604/65 |
| 6,377,058 B1 | 4/2002 | Pemrick |
| 6,378,545 B1 | 4/2002 | Bozkan et al. |
| 6,398,196 B1 * | 6/2002 | Light et al. ............ 261/130 |
| 6,443,369 B1 | 9/2002 | Dohrmann et al. |
| 6,526,731 B1 | 3/2003 | Hunter et al. |
| 6,527,835 B1 | 3/2003 | Manginell et al. |
| 6,848,627 B2 * | 2/2005 | Oepping et al. ............ 239/11 |
| 6,866,063 B2 | 3/2005 | Avila |
| 6,932,098 B2 | 8/2005 | Shajii et al. |
| 7,036,751 B1 | 5/2006 | Lund et al. |
| 7,114,376 B2 | 10/2006 | Loucks et al. |
| 7,168,636 B2 | 1/2007 | Lebeda et al. |
| 7,231,815 B2 | 6/2007 | Kanare |
| 7,300,003 B1 | 11/2007 | Kreikemeier |
| 7,415,924 B2 | 8/2008 | Roberts |
| 7,743,699 B1 * | 6/2010 | Freeman et al. ............ 100/73 |
| 2002/0124541 A1 * | 9/2002 | Oepping et al. ............ 56/16.4 R |
| 2005/0077389 A1 | 4/2005 | Lebeda et al. |

* cited by examiner

ULTRA-LOW FLOW AGRICULTURAL PUMP WITH UNOBSTRUCTED FLOW PATH AND ELECTRONIC FLOW CONTROL, TANK REFILL INDICATION, AND DETECTION OF LOSS OF FLOW

CROSS REFERENCE TO RELATED APPLICATIONS

This application claims priority to U.S. provisional patent application Ser. No. 61/294,803, filed on Jan. 13, 2010, of like title and inventorship, the contents and teachings which are incorporated herein by reference in entirety.

BACKGROUND OF THE INVENTION

1. Field of the Invention

The present invention relates generally to motorized harvesters with crop conditioner means, and more particularly to a harvester-supported ultra-low flow forage applicator that provides forage preservatives to forage during harvester operation.

2. Description of the Related Art

The way forage is harvested and stored determines how well the quality of the crop is preserved. Large quantities of water must be passively removed from cut forage during field-curing of hay. For each ton of 12, percent moisture hay produced, approximately 1.7, and 2.2, tons of water is removed from the fresh herbage of grasses and legumes, respectively. Grain silage may likewise be treated and preserved often times at higher moisture contents.

Preservatives applied at harvest will reduce storage losses from molds, bacteria, and fungi when the forage is put up at higher moisture contents. There are many types of forage preservatives with various effects. The various products can be grouped, for exemplary purposes, into the five following categories: organic chemicals, inorganic chemicals, biologicals, nutrients, and non-specified additive ingredients.

Of these five categories, biological preservatives are of the most interest with regard to the present invention. Biological preservatives may be comprised of either or both bacterial inoculants and enzymes. Bacterial inoculants such as lactobacilli and pediococcus have been proven to be safe and non-toxic while delivering improved dry matter retention, improved protein retention, stability and animal acceptance, while remaining cost-effective. Inoculation of forage material with desirable acid-producing bacteria helps to initiate a rapid fermentation and sustain a rapid fall in pH of silage. In forage this effect is known to reduce the harmful effects of mold and yeast. In crops that are wilted, and water-soluble carbohydrates are not a problem, research has shown that the use of lactic acid bacteria is a cost-effective means of improving fermentation. Lactic acid bacteria produce both acetate and lactate under low oxygen conditions, which inhibits yeast. The pH level drops quickly, viable counts of yeast and mold are reduced, and the resulting product is very stable.

Enzymes, which for exemplary purposes only and not limiting thereto may comprise cellulose and amylose, have also been proven to be safe and non-toxic while delivering improved dry matter retention, improved protein retention, stability and animal acceptance, while remaining cost-effective. These enzymes promote plant cell breakdown and render the cellulose and starch more accessible to desirable bacteria.

A variety of biological compositions suitable for forage applications are commercially available, and are illustrated for exemplary purposes in U.S. Pat. No. 5,637,494, to King and European published application EP 0 834 259, to Moran, each assigned to Ecosyl and incorporated herein by reference in entirety for their content and teachings. In spite of the existence and availability of these commercial products, the microbiological compositions are known to be very sensitive. They may be destroyed by sudden pressure changes, are very sensitive to temperature and pH, and can readily clog in smaller cross-sectional flow paths.

Forage preservative applicators have been in use for years. Conventional preservative applicators are comprised of a relatively large tank (25, to 100+ gallons), a pressure pump fluidly connected to the tank, pressure gauges and regulators fluidly connected to the pressure pump, and spray nozzles fluidly connected to the pressure pump for dispersing the preservative. These commercial applicators were designed to apply chemical preservatives rather than biological preservatives.

When using a conventional forage preservative applicator to apply a biological preservative, several problems are encountered. With conventional preservative applicators, the reservoirs often times exceed 50, gallons. In contrast to most chemical preservatives, biological preservatives generally have a short window of time within which they may be prepared and applied, meaning too large a batch will result in substantial losses of preservative. Since the cost of biological preservatives is high, this is very undesirable. In addition, the high volume of application used for chemical preservatives is not well suited to the extremely low volumes used with biological preservatives. The high volumes are generally also associated with high pressure pumps. This increased pressure can damage or kill the bacteria in an inoculant. Consequently, while these devices may be suitable for chemical application, they are not suitable for efficiently and accurately providing biological forage preservatives to forage during harvesting.

More recent applicators have been developed that are much more suitable for use with biological preservatives. One such system is illustrated in U.S. Pat. No. 6,443,369, by the present inventor, the contents and teachings which are incorporated herein by reference in entirety. That system provides improved application over those of the prior art, but relies upon close user supervision, accurate prediction of crop characteristics, and proper system maintenance. While such system works well for conscientious operators, the present invention seeks to offer the same and additional benefits, while reducing the requirements placed upon the operator.

In addition to the aforementioned patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a motorized harvester operative to harvest a crop and condition the crop during harvest with a biological preservative. The harvester has an operator cab;

a motor; a carriage driven by said motor; a crop cutter and collector; a processing body; and a forage preservative applicator system operatively supported by the carriage. In the forage preservative applicator system, a first reservoir stores a volume of biological solution, and a second reservoir stores a flush solution. An ultra-low flow pump, such as a peristaltic pump, is fluidly coupled through a valve to either the biological solution reservoir or the flush reservoir. A dispensing tube fluidly couples the pump outlet to a forage applicator outlet that dispenses the biological solution into the forage being harvested. A flow detector is provided to monitor biological solution flow rate.

In a second manifestation, the invention is an ultra-low flow agricultural forage preservative applicator system for applying a biological solution to forage during harvesting. A reservoir stores a volume of biological solution. A pump is fluidly coupled to the biological solution reservoir. A dispensing tube fluidly couples the pump outlet to a forage applicator outlet that dispenses the biological solution into the forage being harvested. A flow detector is provided to monitor biological solution flow rate. A biological fluid pathway extending between a biological solution reservoir outlet and a dispensing tube outlet is of functionally equal cross-section entirely throughout, resulting in an unobstructed flow path and avoiding potential clogging.

In a third manifestation, the invention is a method of applying an agricultural forage preservative to forage during operation of a harvester. According to the method, a reservoir is filled with a biological solution having bacterial inoculants. A rate of harvest by said harvester is detected, and biological solution is drawn from the reservoir by a pump and pumped to an outlet adjacent the forage. A flow of the biological solution from reservoir to forage is detected, and the output of the pump is controlled responsive to rate of harvest.

OBJECTS OF THE INVENTION

Exemplary embodiments of the present invention solve inadequacies of the prior art by providing a biological solution reservoir, a flush reservoir, a peristaltic pump, a valve operative to either couple the pump with the biological solution or the flush solution, and a dispensing tube, where the biological fluid containing pathways are of functionally like cross-section in the region between the biological solution reservoir outlet and the dispensing tube outlet. A flow detector is provided to monitor biological solution flow rate, and a moisture detector and harvest rate detector may be used for automatic control.

A first object of the invention is to provide a forage preservative applicator system having an ultra-low flow rate. A second object of the invention is to preserve the viability of a biological forage preservative during application to forage. Another object of the present invention is to provide an unobstructed flow path for the biological forage preservative during application to forage. A further object of the invention is to readily enable the biological forage preservative to be flushed from the applicator after application to forage is complete. Yet another object of the present invention is to enable any remaining biological forage preservative to be easily removed from harvester equipment for refrigerated storage until next needed. A further object of the invention is the enablement of reliable and semi-automated control of ultra-low-flow biological preservative application.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 1 illustrates a preferred embodiment forage preservative applicator system designed in accord with the teachings of the present invention in further operative combination with a harvester from side view.

FIG. 2 illustrates the preferred embodiment forage preservative applicator system of FIG. 1 by schematic view.

FIGS. 3 and 4 illustrate preferred embodiment coupling plates or faces for the pump and pump motor, respectively, by bottom and top views, respectively.

FIG. 5 illustrates the preferred embodiment of FIGS. 1-2 by functional diagram.

FIG. 6 illustrates an alternative embodiment semi-automatic baling apparatus by functional diagram.

DESCRIPTION OF THE PREFERRED EMBODIMENT

In a most preferred embodiment of the invention illustrated in FIGS. 1 and 2, a preferred harvesting apparatus 1 has, in combination, a harvester 2 and biological forage applicator apparatus 10. Harvester 2 is illustrated herein for exemplary purposes only, the construction of which is not critical to the present invention, and which may therefore deviate from the illustration as is known in the industry where there are many designs and types of harvesters. Harvester 2 may typically comprise an operator cab 3, a crop cutter 4, a processing body 5, and an ejection chute 6. The preferred embodiment forage preservative applicator system 10 will most preferably be operatively supported upon harvester 2, and comprises a reservoir 20 for storing a volume of biological solution and a flow controlling apparatus 30. In addition, and independently of whether wirelessly or through wired connection, an operator control panel 90 will be provided to permit a harvester operator to interface with forage preservative applicator system 10. An output from flow controlling apparatus will be coupled to an appropriate location within harvester 2, as will be best determined by the specific construction of harvester 2. One such arrangement is illustrated in my U.S. Pat. No. 6,443,369, the contents and teachings which were incorporated herein above by reference.

FIG. 2 illustrates the fluid flow paths of the preferred embodiment forage preservative applicator system 10 of FIG. 1 by schematic view. An inlet 61 to valve 60, which in the preferred embodiment is electrically controlled, is fluidly connected to reservoir 20 through tubing 15. A flush container 25 is preferably also fluidly connected to a second inlet 62 to valve 60, which allows valve 60 to selectively control whether biological solution or flush solution is passed through outlet 63 to pump 40. Subsequent to pump 40 is a dispensing tube 54, which is preferably suitable for dispensing the biological solution into the forage being harvested. The details of this may be found in my U.S. Pat. No. 6,443,369, though it is noteworthy herein that this dispensing tube does not include any flow restrictors such as nozzles or other apparatus. Instead, the entire fluid path from biological solution reservoir 20 outlet to the outlet of dispensing tube 54 has a functionally like cross-section, resulting in an unobstructed flow path and avoiding potential clogging. While flow cross-sections may vary slightly at couplings or connectors and the like, there are no sudden and operatively significant or substantial diameter changes. Even within pump head 48, which is preferably of the peristaltic type, the tubing is fully collapsed and slid to flow the biological solution in an adjacent and nearly full cross-sectional region. Consequently, the solution does not undergo sudden transitions during flow through different cross-sectional areas.

A flow detector 50 having an inlet 51 and outlet 52 is preferably provided in-line between reservoir 20 and the outlet of dispensing tube 54, to monitor flow rate there through, or to at least to detect a no-flow or under-flow event such as might occur with a hose rupture or pump 40 malfunction.

Apparatus such as an ice pack or other cooling or refrigeration device is preferably utilized within reservoir 20 to maintain the temperature of a biological solution at the desired temperature, to thereby extend the useful time of the solution. Reservoir 20 is additionally most preferably thermally insulated, such as through a layer of foamed polyurethane, air gaps, or other suitable foamed or insulating materials as might be commonly found in conventional coolers and the like. While not separately illustrated, reservoir 20 may optionally incorporate a fluid level detection device such as an ultrasonic detector, pressure sensor, or other apparatus to indicate fluid levels or the need for refill. Most preferably, the fluid level detection device will most preferably be of a construction which requires no cleaning, and which does not interfere with ordinary cleaning of the reservoir.

Flush container 25 is preferably capable of storing a volume of flushing fluid such as water, bleach solution or other agent for flushing the various tubing 15, flow detector 50, pump 40, and dispensing tube 54 after usage thereof to reduce the buildup of bio-film from dead biological or enzymatic matter or other residue. In accord with the objectives of the present invention, this preferred embodiment forage preservative applicator system 10 features: ultra-low flow; an unobstructed flow path; electronic flow control for high accuracy flow detection; tank refill indication; detection of loss of flow; and remote source switching, to enable flow path rinse.

In use, the operator fills reservoir 20 with a desired solution such as bacterial inoculants and enzymes. The operator may dilute the solution with water or other fluid if desired to achieve the desired rates of application. The operator may then insert at least one ice pack into the interior of the reservoir within the solution to help retain the temperature of the solution at a relatively cool temperature relative to outside of the reservoir, thereby extending the useful life of the bacteria and enzymes during warm periods of weather. The operator sets valve 60 so that fluid flow from reservoir 20 is allowed. When harvester 2 is in operation, the operator adjusts rate settings at console 90, which comprises an electronic controller unit, to in turn control the output of pump 40. The operator then initiates the system run, whereby the controller unit closes a power switch or relay within control board 95 to activate the pump. Pump 40 draws solution from within reservoir 20 through tubing 15, valve 60, and flow detector 50 through to dispensing tube 54. From the outlet, the solution exits the distal end of dispensing tube 54 for exemplary purposes onto the forage and cutting assembly of harvester 2, where the solution is thoroughly mixed in with the forage being chopped. If an increased rate of forage is run through harvester 2, then console 90 is adjusted accordingly so that pump 40 outputs an increased rate of the biological solution. If a lower rate of forage is run through harvester 2, then console 90 is adjusted accordingly so that pump 40 outputs a decreased rate of solution. In the preferred embodiment, reservoir 20 is insulated, and the temperature within reservoir 20 and the solution held therein is retained at a relatively low temperature to extend the useful life of the biological ingredients.

When the operator is finished operating harvester 2, the operator then switches valve 60 so that fluid from flush container 25 may enter inlet 62, to pass to outlet 63, through pump 40 and dispensing tube 54. Flush container 25 may contain water, bleach or other cleaning solution to clean and prevent the buildup of bio-film. For known commercially available solutions, this flush is critical to the maintenance of the system, since the biological materials may otherwise form a residue upon the internal components. Since the system operates at minimal pressures and flow rates to protect the integrity of the biological material, any residue will not easily be removed after it dries or adheres.

After flushing the system, the operator may preferably remove reservoir 20 from harvesting implement by disconnecting tubing 15 and removing any fasteners holding reservoir 20 to harvester 2. While some exemplary fasteners are illustrated in my U.S. Pat. No. 6,443,369, other suitable means are contemplated herein and will be recognized by those skilled in the art of hardware and fasteners. Reservoir 20 may then be placed within a cool structure such as a refrigerator. Another ice pack may also be added to the solution within the reservoir to assist in maintaining the desired cool temperature of the solution. The operator simply reconnects the removed components when desired to operate the implement again and repeats the above steps.

Figure 2:
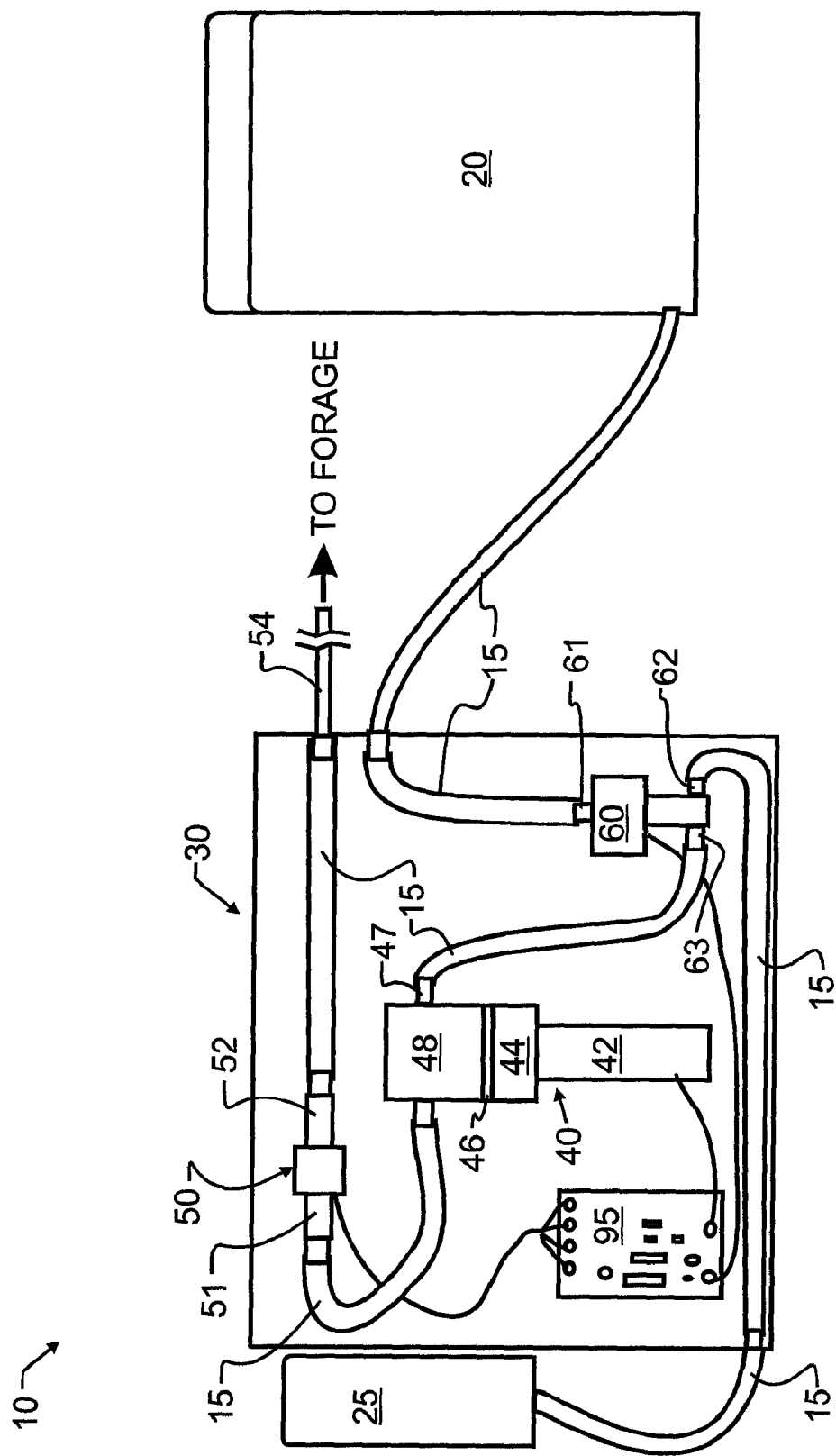
Figure 4:
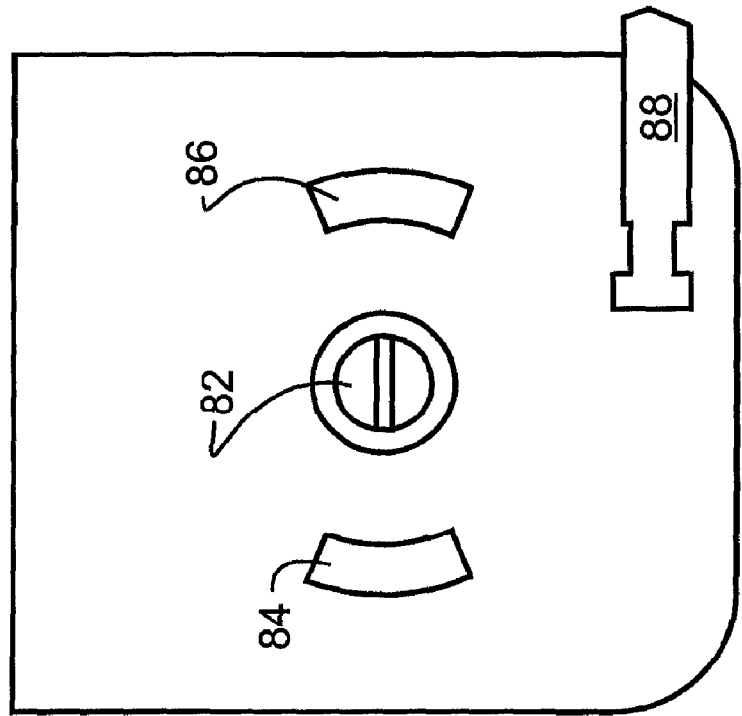
Figure 3:
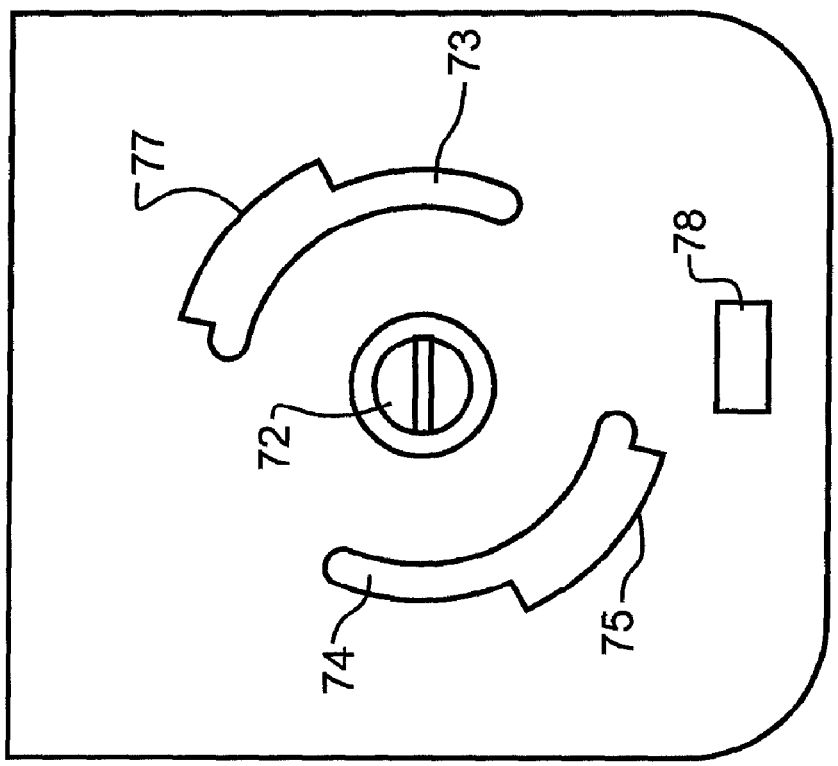

FIGS. 3 and 4 illustrate in greater detail preferred embodiment coupling plates or faces 46 shown in FIG. 2 for motor 42 having a mounting shoe 44 to couple to pump 48. The coupling plates 70, 80 provide an improved method of connection between pump 48 and motor shoe 44 which allow for ready removal and replacement. As shown in FIG. 3, pump coupling plate 70 has a pair of slots 74, 76, each which have enlarged regions 75, 77 respectively. These enlarged regions allow protrusions 84, 86 to pass freely through, and, upon rotation of motor plate 80, these protrusions 84, 86 are securely held in the narrow portions of slots 74, 76. Grooves may be provided to undercut the exposed faces of protrusions 84, 86 which are small enough to fit within the narrowed regions, while the faces of protrusions 84, 86 are somewhat larger to only pass through the enlarged regions 75, 77. Finally, a plunger 88 or other release mechanisms as known from the hardware area, such as a spring pin or the like, may be provided to engage in receiver 78 to prevent relative rotation between plates 70, 80.

Most preferably, console 90 controller operates in conjunction with peristaltic pump 48 and motor 42 to provide high accuracy flow detection. This is achieved by using a motor having Hall Effect or other RPM measuring or determining technology to monitor or accurately calculate the motor output shaft rotation rate, which is the rotation rate of pump 48. The output of a peristaltic pump may be accurately predicted in the present low-pressure system, based upon rotation rate.

Alternatively, a high accuracy flow detector may be used that determines the flow rate. In such instance, the pump rotation rate may be disregarded, or may alternatively be used to compare to the expected flow rate. In the event the flow rate calculated from the pump differs consequentially from flow rate determined by the detector, an error or warning may be generated. This could occur due to failure of the tubing, failure of the detector, lack of sufficient fluid in the reservoir, or from other predictable and unpredictable causes.

A preferred embodiment flow detector 50 in accord with the teachings of the present invention will preferably detect flow or loss thereof, and will most preferably be a detector which preserves a relatively or even preferably completely unobstructed flow path. An in-line thermal dispersion device or thermal mass sensor has no moving parts exposed to the biological solution, and can detect very minute flow rates. This is particularly important for the low flow rates that the present invention may be designed to operated at. Such a device operates by measuring a temperature differential between an upstream heated temperature sensor and a downstream reference temperature sensor. When there is no flow, the temperature differential between heated and reference sensor is greatest, and with greater flow, the temperature differential decreases. The heated and reference temperature sensors may be provided in the wall of the fluid path, and so may leave the fluid path completely open. The remaining components of the preferred embodiment have likewise been designed and selected to avoid obstruction at low flow rate and to act cooperatively with biological solutions.

Reservoir tank 20 refill indication may additionally be calculated from the flow control determination, but may include additional sensing or verification from within the tank, preferably without requiring electrical connection to the tank to permit ready removal, storage, and cleaning.

Figure 5:
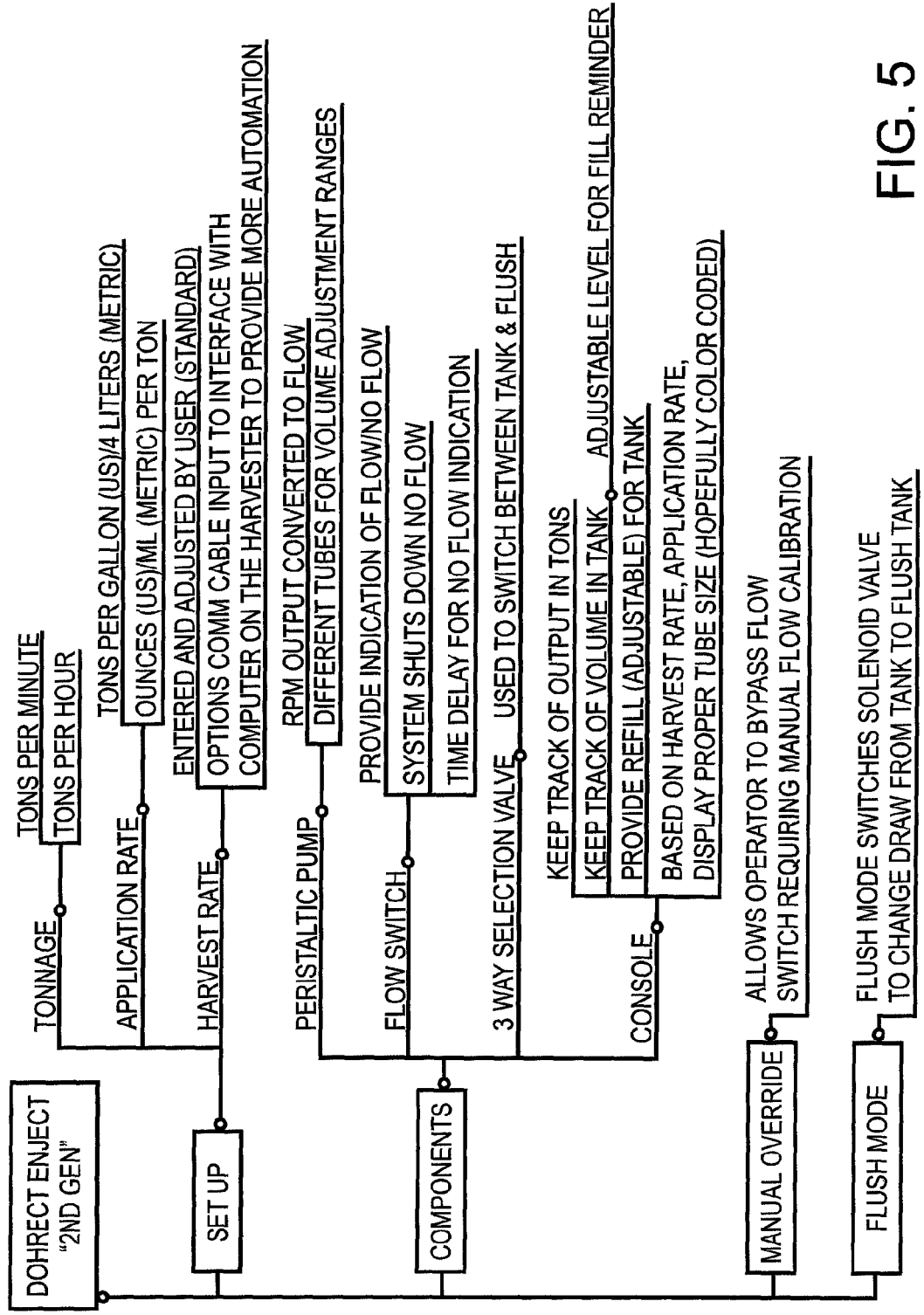
Figure 6:
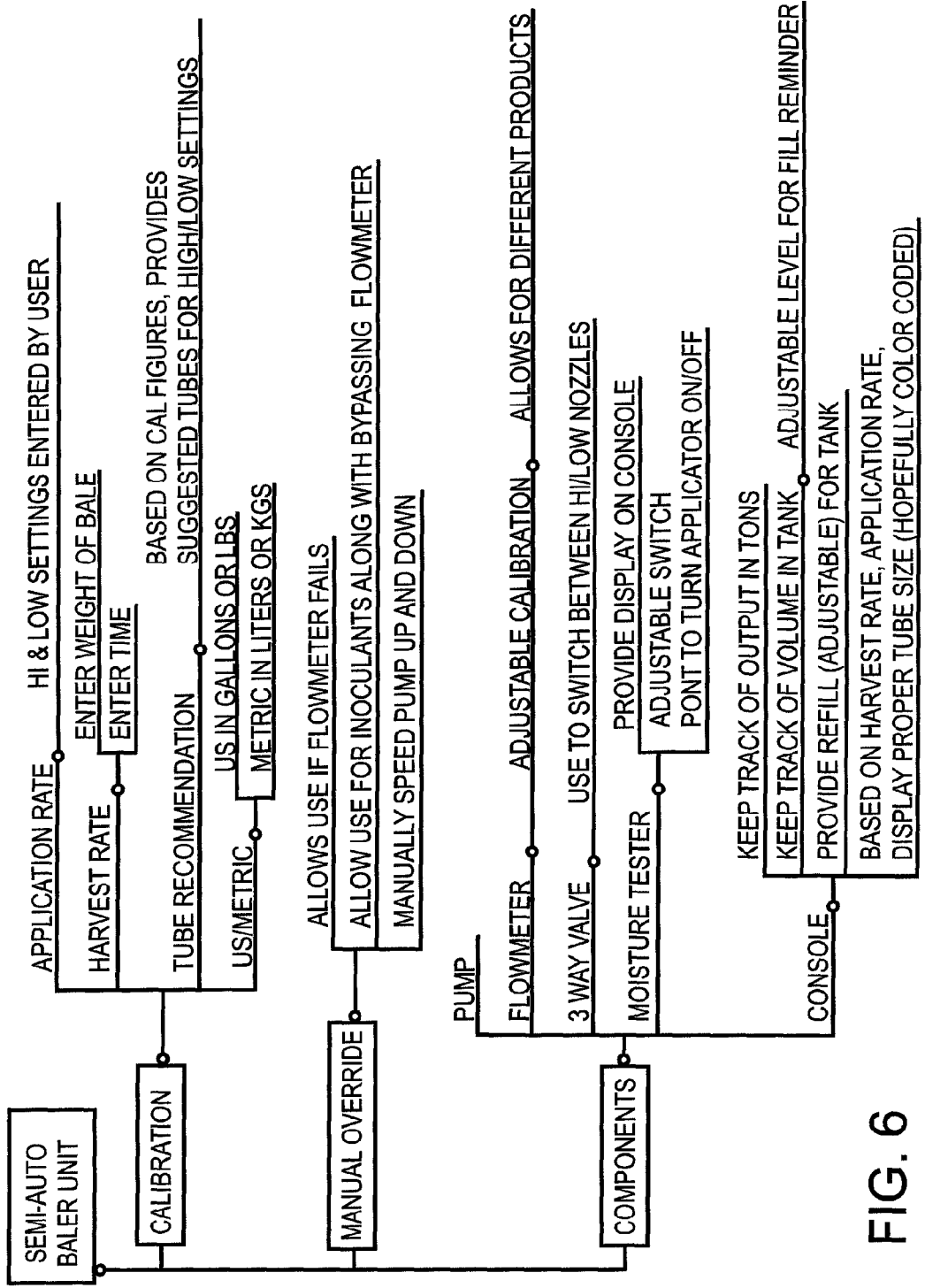

FIG. 5 illustrates a decision tree and control system functionally for the operation through control panel 90, while FIG. 6 illustrates an alternative embodiment apparatus by functional diagram.

In accord with the teachings of the present invention, a number of other features are contemplated herein. Among these are the full automation of the system through the incorporation of crop moisture content, harvest rate, and desired application rate. Equipment is known in the industry for each of these functions, and the application to the present invention will be apparent to those skilled in the art.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. An agricultural forage preservative applicator system for delivering a biological solution to forage during harvesting, comprising:
    a reservoir for storing a volume of biological solution;
    a pump having an inlet and an outlet;
    a dispensing tube fluidly connected to said pump outlet defining a fluid flow path for operatively dispensing said biological solution into the forage being harvested; and
    a flow detector within said fluid flow path between said pump outlet and said forage and operative to monitor biological solution flow rate;
    wherein a biological fluid pathway extending between a biological solution reservoir outlet and a dispensing tube outlet is of functionally equal cross-section entirely throughout, resulting in an unobstructed flow path and avoiding potential clogging.

2. The agricultural forage preservative applicator system of claim 1, further comprising:
    a second reservoir for storing a flush solution; and
    a valve fluidly connected to said first and second reservoirs and said pump and operative to selectively couple said pump in a first position to said first reservoir and in a second position to said second reservoir.

3. The agricultural forage preservative applicator system of claim 1, wherein said flow detector further comprises a thermal mass flow sensor.

4. The agricultural forage preservative applicator system of claim 1, wherein said pump further comprises a peristaltic pump.

5. The agricultural forage preservative applicator system of claim 1, further comprising a means to compare a fluid output from said pump to a level calculated based upon an output from said flow detector, and signal a discrepancy therebetween.

6. The agricultural forage preservative applicator system of claim 1, wherein said pump further comprises an RPM measurement apparatus that measures the rotation rate of said pump.

7. The agricultural forage preservative applicator system of claim 6, further comprising a controller operative to calculate an expected flow rate based upon said pump RPM measurement and compare said expected flow rate with an output from said flow detector and signal an error when said calculated flow rate and said flow detector output differ consequentially.

8. The agricultural forage preservative applicator system of claim 1, wherein said biological solution further comprises bacterial inoculants.

* * * * *